US012303908B1

United States Patent
Li et al.

(12) United States Patent
(10) Patent No.: US 12,303,908 B1
(45) Date of Patent: May 20, 2025

(54) GRINDING AND CRUSHING MACHINE FOR MAGNESIUM POWDER PRODUCTION

(71) Applicant: Shanxi Fuhengdi New Materials Co., Ltd., Yuncheng (CN)

(72) Inventors: Junping Li, Yuncheng (CN); Juncai Chai, Yuncheng (CN)

(73) Assignee: Shanxi Fuhengdi New Materials Co., Ltd., Yuncheng (CN)

( * ) Notice: Subject to any disclaimer, the term of this patent is extended or adjusted under 35 U.S.C. 154(b) by 0 days.

(21) Appl. No.: 18/961,238

(22) Filed: Nov. 26, 2024

(30) Foreign Application Priority Data

Jul. 24, 2024 (CN) ........................ 202410994563.0

(51) Int. Cl.
*B02C 19/00* (2006.01)
*B02C 2/00* (2006.01)
*B02C 23/08* (2006.01)

(52) U.S. Cl.
CPC ............ *B02C 19/0043* (2013.01); *B02C 2/00* (2013.01); *B02C 23/08* (2013.01)

(58) Field of Classification Search
CPC ....... B02C 19/061; B02C 19/06; B02C 23/24; B02C 23/26; B02C 23/28; B02C 23/30; B02C 23/32; B02C 23/00; B02C 23/10; B02C 23/12; B02C 23/16; B02C 2023/165
See application file for complete search history.

(56) References Cited

U.S. PATENT DOCUMENTS 6,036,126 A * 3/2000 Cappola .................... A61P 9/06 209/320

FOREIGN PATENT DOCUMENTS

| | | | |
|---|---|---|---|
| CN | 109304252 A | * | 2/2019 |
| CN | 116899720 A | * | 10/2023 |
| CN | 118527236 A | * | 8/2024 |

OTHER PUBLICATIONS

Translation of CN-118527236 (Year: 2024).*
Translation of CN-116899720 (Year: 2023).*
Translation of CN-109304252 (Year: 2019).*
Office action, CN Appl. No.202410994563.0, Issued Aug. 28, 2024, 12 Pages.
Search report, CN Appl. No.202410994563.0, Issued Aug. 26, 2024, 4 Pages.
Search report, CN Appl. No.202410994563.0, Issued Sep. 4, 2024, 4 Pages.
Notification to Grant, CN Appl. No.202410994563.0, Issued Sep. 9, 2024, 3 Pages.

* cited by examiner

*Primary Examiner* — Bobby Yeonjin Kim
(74) *Attorney, Agent, or Firm* — FisherBroyles, LLP

(57) ABSTRACT

A grinding and crushing machine for magnesium powder production is provided, including a base, supporting columns, an air-flow pressure crushing mechanism and an anti-blocking conical rotating and uniform crushing mechanism. The supporting columns are symmetrically arranged on the side wall of the base, the air-flow pressure crushing mechanism is arranged on the upper wall of the base, the anti-blocking conical rotating and uniform crushing mechanism is on the supporting columns, and the air-flow pressure crushing mechanism includes a gas source mechanism, a gas conveying mechanism and an impact mechanism.

3 Claims, 14 Drawing Sheets

GRINDING AND CRUSHING MACHINE FOR MAGNESIUM POWDER PRODUCTION

CROSS-REFERENCE TO RELATED APPLICATIONS

This application claims priority to Chinese Patent Application No. 202410994563.0, filed on Jul. 24, 2024, the contents of which are hereby incorporated by reference.

TECHNICAL FIELD

The disclosure belongs to the technical field of magnesium powder production, and in particular to a grinding and crushing machine for magnesium powder production.

BACKGROUND

In the production of magnesium powder, commonly used grinding equipment includes the ball mill, the jet mill, the superfine mill and so on. These devices further refine magnesium blocks or magnesium chips into powder through different working principles, such as the grinding action of the ball mill and the high-speed airflow impact action of the jet mill.

At present, the existing grinding and crushing machines for magnesium powder production have the following problems.

In the existing equipment for crushing magnesium powder by using high-speed air flow, the air flow is unevenly distributed in the crushing cavity, which leads to different degrees of impact and friction during the crushing process, resulting in uneven crushing and large difference in particle size. In addition, in the production process of magnesium ingots, if the internal compositions are unevenly distributed and there are impurities, inclusions or different phase structures, these parts will show high hardness and toughness during crushing, and are difficult to be fully crushed, thus forming blocks with hard strength. The traditional grinding and crushing device for magnesium powder production does not have the capability of refining and crushing hard magnesium powder raw materials, so it cannot meet the existing demand for the raw material crushing equipment for magnesium powder production.

SUMMARY

In view of the above situation, in order to overcome the defects of the prior art, a grinding and crushing machine for magnesium powder production is provided, which may uniformly crush magnesium powder raw materials and has the ability to finely crush hard magnesium powder raw materials.

The grinding and crushing machine for magnesium powder production includes a base and supporting columns, an air-flow pressure crushing mechanism and an anti-blocking conical rotating and uniform crushing mechanism. The supporting columns are symmetrically arranged on a side wall of the base; the air-flow pressure crushing mechanism is arranged on an upper wall of the base; the anti-blocking conical rotating and uniform crushing mechanism is arranged on the supporting columns. The air-flow pressure crushing mechanism includes a gas source mechanism, a gas conveying mechanism and an impact mechanism; the gas source mechanism is arranged on the upper wall of the base, and the gas conveying mechanism is arranged on a side wall of the gas source mechanism; and the impact mechanism is arranged on the supporting columns. The anti-blocking conical rotating and uniform crushing mechanism includes a conical filtering mechanism, a rotating grinding mechanism and a material pushing mechanism; the conical filtering mechanism is arranged on an inner wall of one end of the impact mechanism, and the rotating grinding mechanism is arranged inside the conical filtering mechanism; and the material pushing mechanism is arranged on a bottom wall of the impact mechanism.

In an embodiment, the gas source mechanism includes a gas source box, a gas compressor and a compressed gas pipe; the gas source box is arranged on the upper wall of the base, the gas compressor is arranged in the gas source box; and the compressed gas pipe penetrates through the gas source box and is arranged at an exhaust end of the gas compressor. The gas conveying mechanism includes a main gas pipe, an annular pipe, shunt pipes, shunt valves and a main gas valve; the main gas pipe is in communication with one end of the compressed gas pipe away from the gas compressor; the annular pipe is in communication with one end of the main gas pipe away from the compressed gas pipe; multiple groups of the shunt pipes are in communication with and arranged at one side of the annular pipe away from the gas source box; the shunt valves are in communication with and arranged outside the shunt pipes; and the main gas valve is in communication with and arranged outside the main gas pipe. The impact mechanism includes a crushing frame, a crushing cylinder, a crushing cavity and impact pipes; the crushing frame is arranged at one end of the supporting column away from the base; the crushing cylinder is arranged at one end of the crushing frame away from the supporting column; and the crushing cavity is arranged in one end of the crushing cylinder close to the gas source box. One end of each of the shunt pipes away from the annular pipe penetrates through the crushing cylinder and is in communication with the crushing cavity; the impact pipes are in communication with and arranged at sides of the shunt pipes away from the annular pipe; the impact pipes are arranged in the crushing cavity; and ends of the impact pipes away from the shunt pipes are oppositely arrange.

When in use, magnesium powder production raw materials are put into the crushing cavity, and the gas compressor transports the generated compressed gas to the main gas pipe through the compressed air pipe. In the initial state, the shunt valves are set to be open and the main gas valve is set to be closed. The main gas pipe transports the compressed gas to the interior of the shunt pipes through the annular pipe, and the compressed gas in the shunt pipes enters the crushing cavity through the impact pipes. Under the impact, collision, friction and shearing effects of high-speed air flow, in the crushing chamber, the collision between magnesium powder raw materials and high-speed airflow becomes frequent and intense, and the magnesium powder raw materials are gradually crushed into fine particles.

In an embodiment, the conical filtering mechanism includes an annular plate, a conical filtering cylinder, crushing plates, a discharge cavity, a discharge port, a rotating grinding annular plate and a bevel annular plate; the annular plate is rotatably arranged on an inner wall of another end of the crushing cylinder away from the crushing cavity; the conical filtering cylinder is arranged on an inner wall of the annular plate, one end of the conical filtering cylinder is opened, and multiple groups of the crushing plates are arranged on a side wall of the conical filtering cylinder; the discharge cavity is arranged in the crushing cylinder at one side of the conical filtering cylinder away from the crushing cavity; the discharge port is arranged on one end of a bottom wall of the crushing cylinder close to the discharge cavity; the rotating grinding annular plate is arranged in the end of the crushing cylinder close to the crushing cavity; and the bevel annular plate is arranged at another side of the conical filtering cylinder close to the rotating grinding annular plate. The rotating grinding mechanism includes a rotating grinding basin, a sound insulation cylinder, a tuning fork, a detection cylinder, a noise sensor, a driving motor and a driving shaft; the rotating grinding basin is arranged at the other side of the conical filtering cylinder close to the crushing cavity, and one end of the crushing cavity is opened; and the sound insulation cylinder penetrates through the conical filtering cylinder and is arranged on a side wall of the rotating grinding basin. The tuning fork is arranged on the side wall of the rotating grinding basin inside the sound insulation cylinder; the detection cylinder is arranged at one side of the sound insulation cylinder away from the rotating grinding basin; the noise sensor is arranged in the detection cylinder; a detection end of the noise sensor penetrates through the detection cylinder and is arranged in the sound insulation cylinder; the detection cylinder is arranged at one side of the crushing cylinder away from the base; and the driving shaft penetrates through the crushing cylinder and is arranged between the conical filtering cylinder and a power end of the driving motor. The material pushing mechanism includes a wear rubber layer, a material pushing rack, impacted plates, impact rods, tension springs, impact iron blocks and driving electromagnets; the wear rubber layer penetrates through another end of the bottom wall of the crushing cylinder close to the crushing cavity; the material pushing rack is arranged between the crushing frame and the base; and multiple groups of the impacted plates are arranged on a bottom wall of the wear rubber layer. Multiple groups of the impact rods penetrate through and are arranged at an upper wall of the material pushing rack; the tension springs are arranged on a bottom wall of the material pushing rack outside the impact rods; ends of the tension springs away from the material pushing rack are connected with the impact rods respectively; the impact iron blocks are arranged on sides of the impact rods close to the impacted plates respectively; and the driving electromagnets are arranged on the upper wall of the material pushing rack outside the impact rods.

When in use, under the action of high-speed airflow generated by the gas compressor, magnesium powder raw materials collide with each other, and the magnesium powder raw materials also collide with the rotating grinding annular plate. The magnesium powder generated by the collision of magnesium powder raw materials in the crushing cavity flows with the gas, and magnesium powder conforming to the diameter of the mesh opening of the conical filtering cylinder flows into the discharge cavity, a magnesium powder storage structure is arranged in the discharge port in advance, and gas containing magnesium powder in the discharge cavity is discharged into the preset magnesium powder storage structure from the discharge port. When the magnesium powder raw material larger than the diameter of the mesh opening of the conical filtering cylinder falls onto the surface of the conical filtering cylinder along with the airflow, the driving motor drives the driving shaft to rotate through the power end, and the driving shaft drives the conical filtering cylinder to rotate along the inner wall of the crushing cylinder through the annular plate, so that the magnesium powder raw material attached to the surface of the conical filtering cylinder is thrown away under the centrifugal movement, and the thrown magnesium powder raw material collides with the rotating grinding annular plate and the bevel annular plate. The magnesium powder generated after the collision flows into the discharge cavity through the mesh opening along with the gas. In addition, the magnesium powder raw materials splashed around the conical filtering cylinder are crushed by the high-speed rotating crushing plate, so that the raw materials which may not be crushed into magnesium powder under the high-speed airflow may be blocked and crushed. On the one hand, the magnesium powder raw materials may be prevented from blocking the mesh opening of the conical filtering cylinder and influencing the passage of magnesium powder; on the other hand, the problem of uneven crushing of magnesium powder raw materials by the high-speed airflow may be made up, so that the magnesium powder raw materials may be crushed evenly.

Specifically, the side wall of the gas source box is provided with a controller.

The controller is electrically connected with the gas compressor, the noise sensor, the driving motor and the driving electromagnets respectively.

In an embodiment, the model of the controller is SYC89C52RC-401.

Further, the model of the noise sensor is BR-ZS1.

By adopting the above structure, the present disclosure has the following beneficial effects.

Compared with the prior art, the present disclosure adopts the mode that the high-speed airflow impact is matched with the centrifugal throwing force and the spring-up conveying structure, and the air-flow pressure crushing mechanism and the anti-blocking conical rotating and uniform crushing mechanism are arranged, under the action of the gas source mechanism, the gas conveying mechanism, the impact mechanism, the conical filtering mechanism, the rotating grinding mechanism and the material pushing mechanism, on the one hand, magnesium powder raw materials may be prevented from blocking the mesh opening of the conical filtering cylinder and influencing the passage of magnesium powder, and on the other hand, the problem of uneven crushing of magnesium powder raw materials by the high-speed airflow may be made up, so that the magnesium powder raw material is evenly crushed. The impacted plate protrudes towards the interior of the crushing cylinder under the deformation of the wear rubber layer, and the magnesium powder raw material on the inner wall of the wear rubber layer bounces into the high-speed airflow discharged from the main gas pipe under the sudden impact, so that the electromagnet is driven to be intermittently electrified through the impact iron block to bounce the magnesium powder raw material on the inner wall of the wear rubber layer. The high-speed airflow with high pressure drives the magnesium powder raw material with high hardness to collide with the rotating grinding basin that is in rotation, and the magnesium powder produced by the collision enters the discharge cavity with the airflow. The remaining magnesium powder raw material is located on the inner wall of the rotating grinding basin under the impact of the high-speed airflow, the rotating grinding basin grinds the magnesium powder raw material through rotation, and gradually refines the magnesium powder raw material with high hardness.

Figure 1:
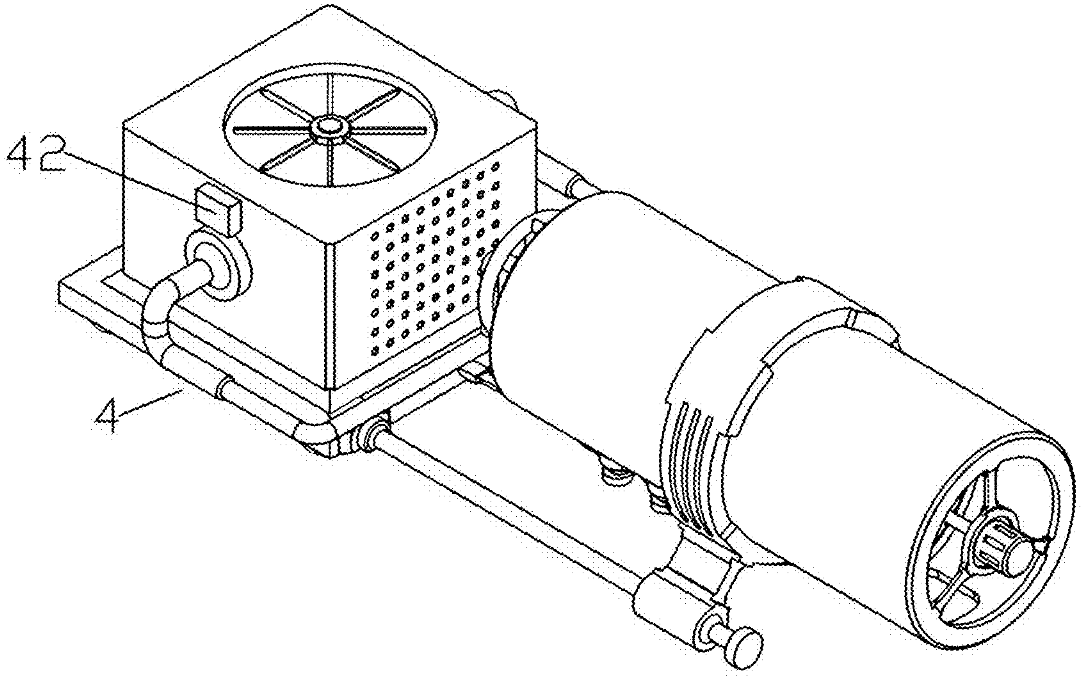
FIG. 1 is a schematic diagram of an overall structure of the present disclosure.

The accompanying drawings are used to provide a further understanding of the present disclosure and constitute a part of the specification. Together with the practical embodiments of the present disclosure, they are used to explain the present disclosure and do not constitute a limitation on the present disclosure.

DETAILED DESCRIPTION OF THE EMBODIMENTS

In the following, the technical solution in the embodiment of the present disclosure will be clearly and completely described with reference to the attached drawings. Obviously, the described embodiment is only a part of the embodiment of the present disclosure, but not the whole embodiment. Based on the embodiments in the present disclosure, all other embodiments obtained by one of ordinary skill in the art without creative effort belong to the protection scope of the present disclosure.

In the description of the present disclosure, it should be understood that the orientation or positional relationships indicated by the terms “longitudinal”, “transverse”, “upper” “lower”, “front”, “rear”, “left”, “right”, “vertical”, “horizontal”, “top”, “bottom”, “inner”, “outer” are based on the orientation or positional relationship shown in the drawings are only for the convenience of describing the disclosure, rather than indicating or implying that the device or element referred to must have a specific orientation, be constructed and operated in a specific orientation, and therefore may not be understood as a limitation to the disclosure.

Figure 2:
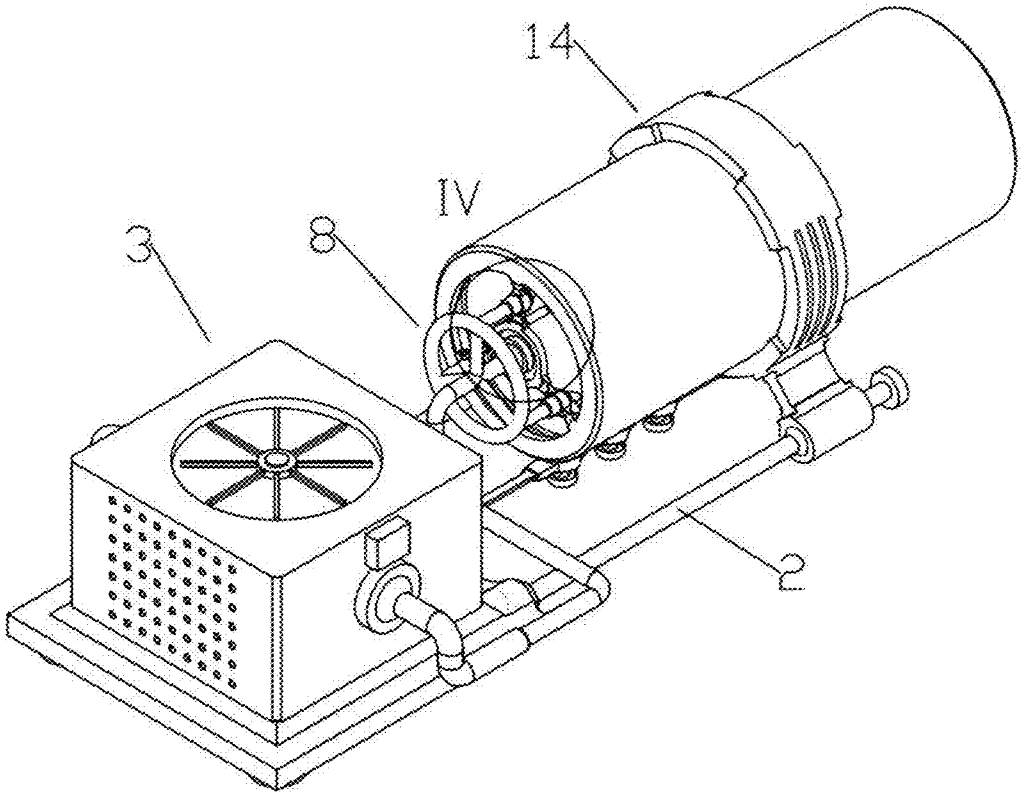
FIG. 2 is a front perspective view of the present disclosure.
Figure 3:
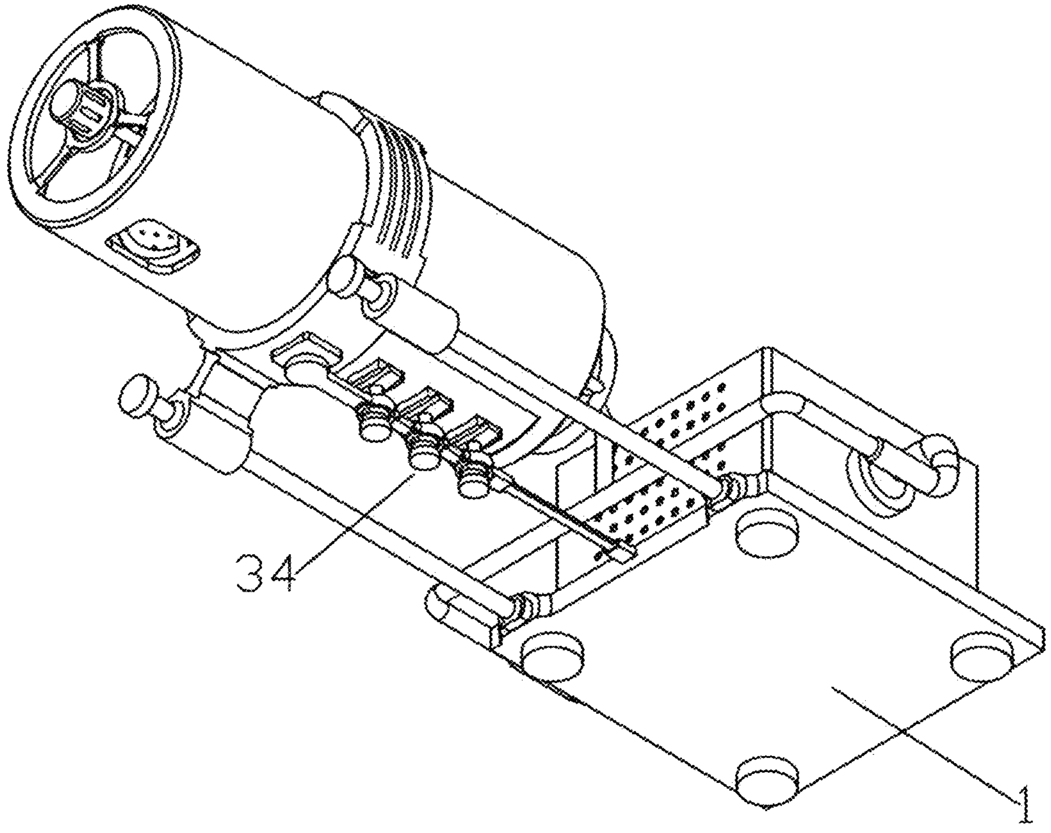
FIG. 3 is a bottom perspective view of the present disclosure.
Figure 4:
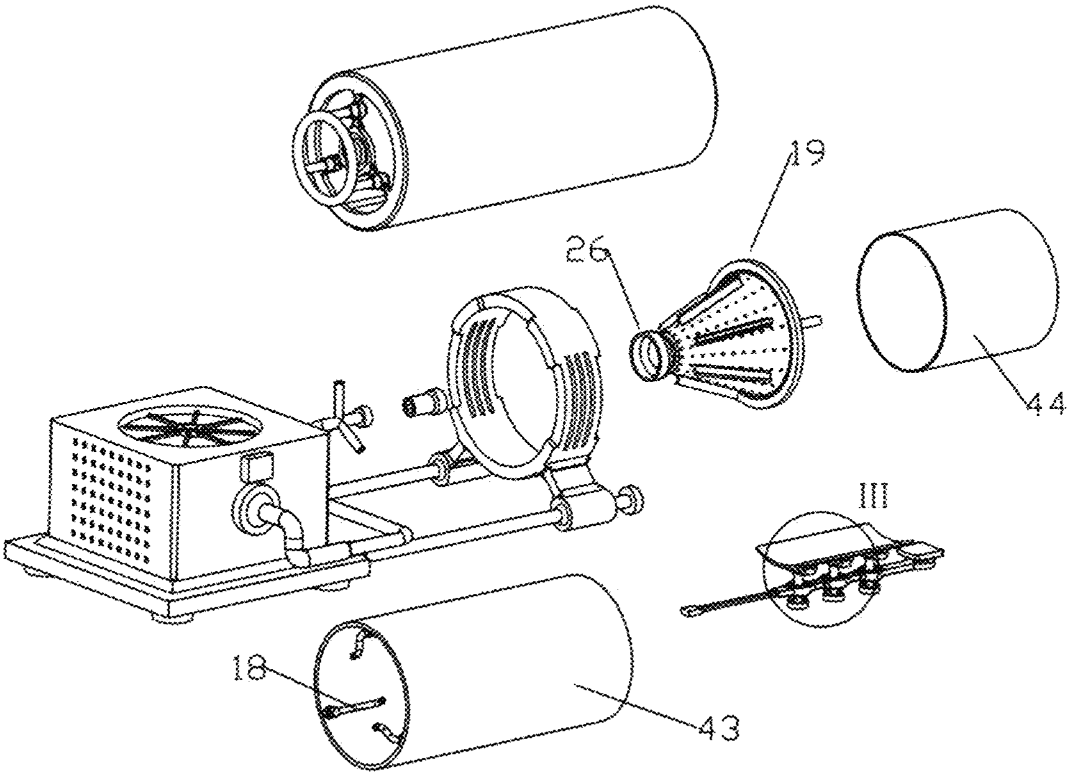
FIG. 4 is a schematic diagram of an exploded structure of the present disclosure.
Figure 5:
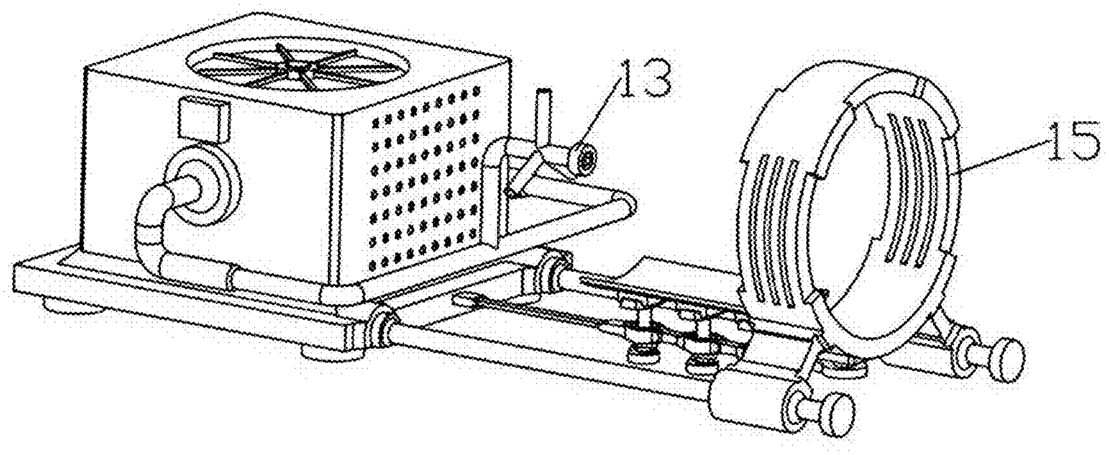
FIG. 5 is a schematic structural diagram of an air-flow pressure crushing mechanism of the present disclosure.
Figure 6:
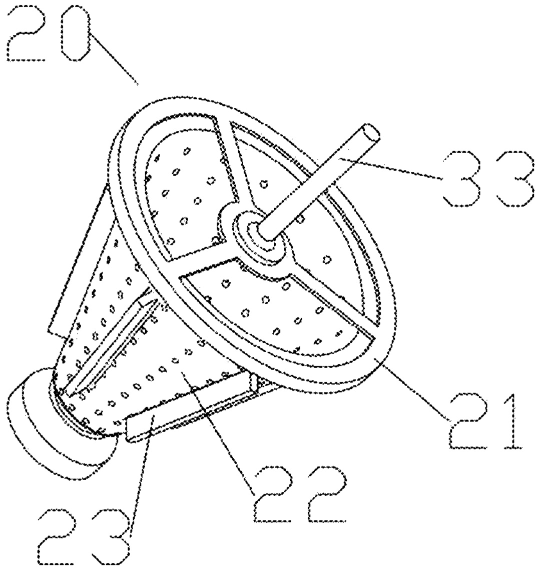
FIG. 6 is a schematic structural diagram of a conical filtering mechanism of the present disclosure.
Figure 7:
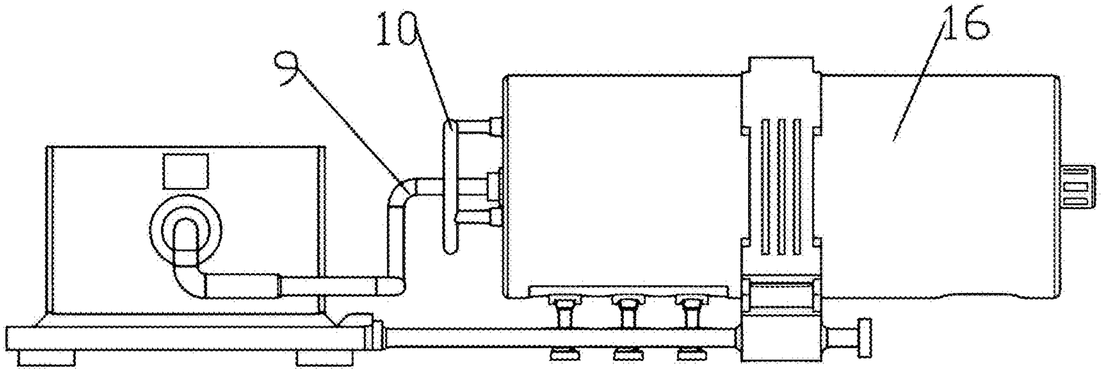
FIG. 7 is a front view of the present disclosure.
Figure 8:
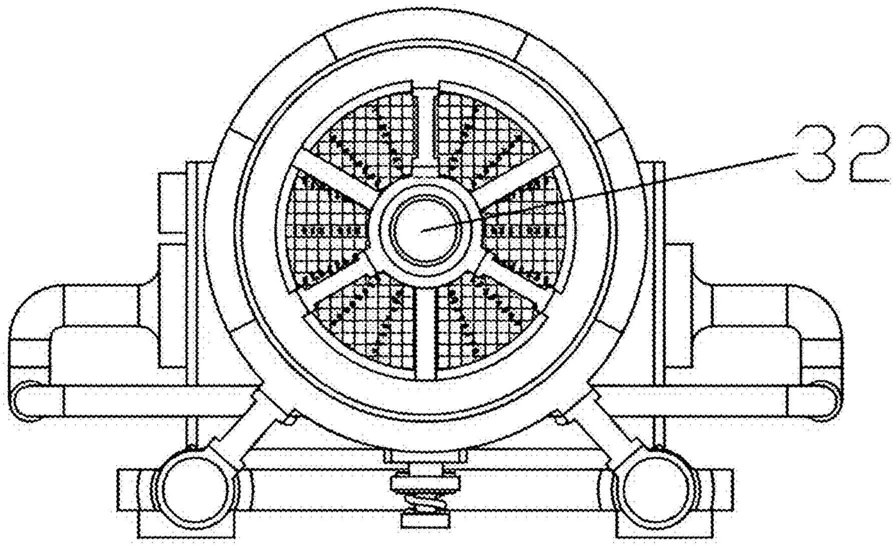
FIG. 8 is a side view of the solution.
Figure 9:
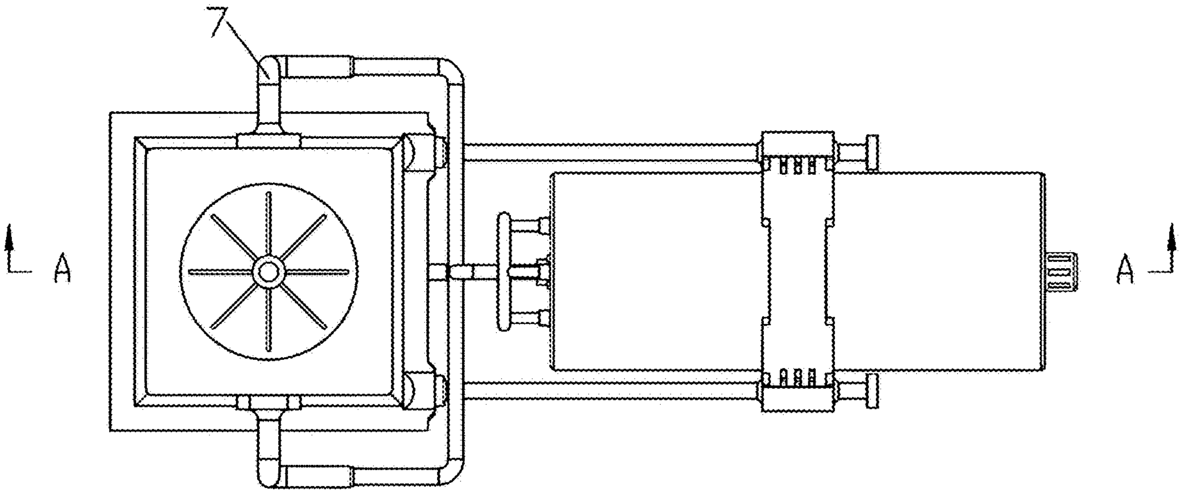
FIG. 9 is a top view of the present disclosure.
Figure 10:
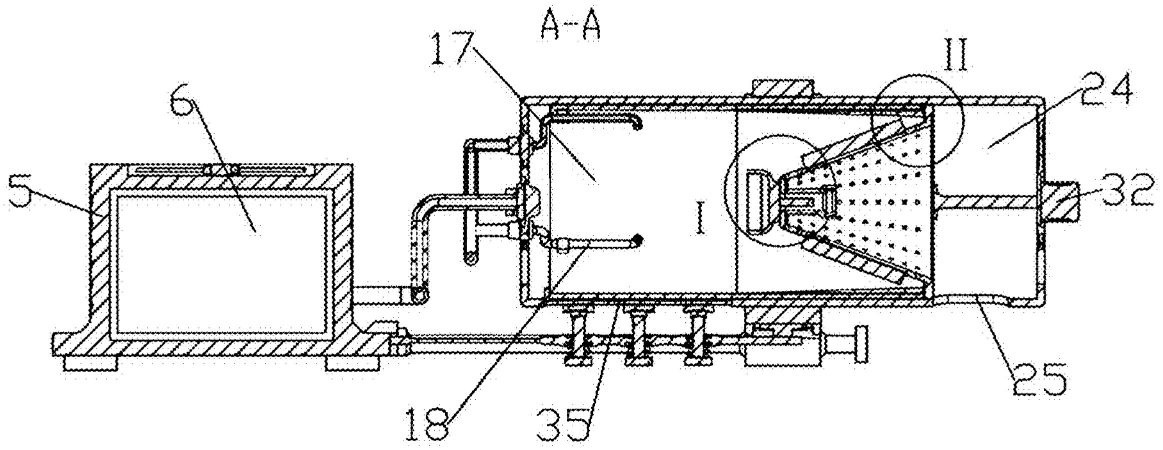
FIG. 10 is a sectional view taken along line A-A of FIG. 9.
Figure 11:
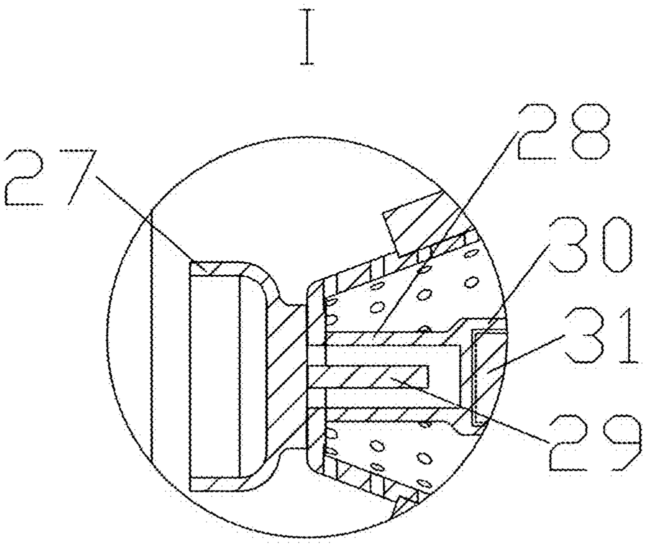
FIG. 11 is an enlarged structural view of part I of FIG. 10.
Figure 12:
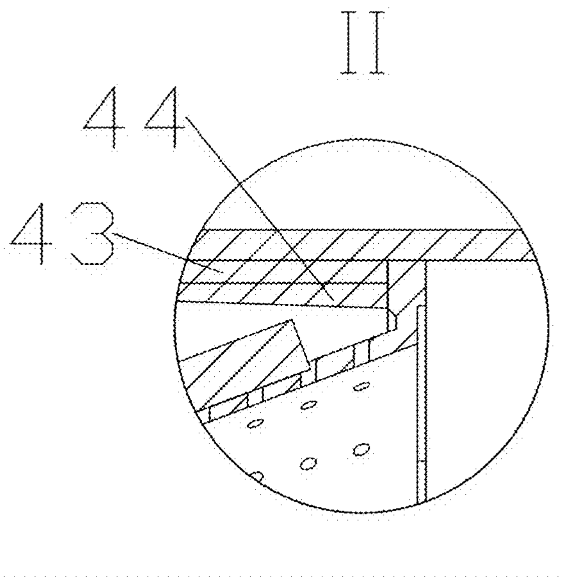
FIG. 12 is an enlarged structural view of part II of FIG. 10.
Figure 13:
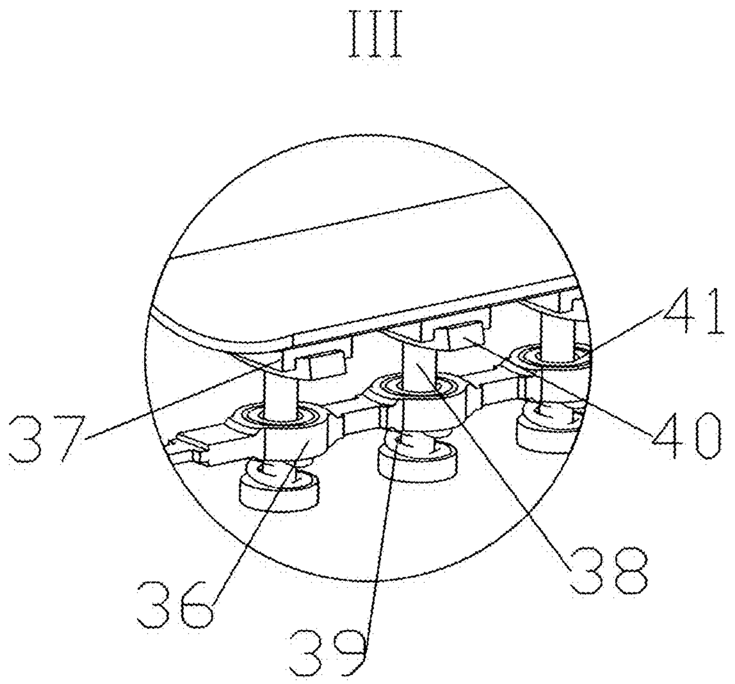
FIG. 13 is an enlarged structural view of part III of FIG. 4.
Figure 14:
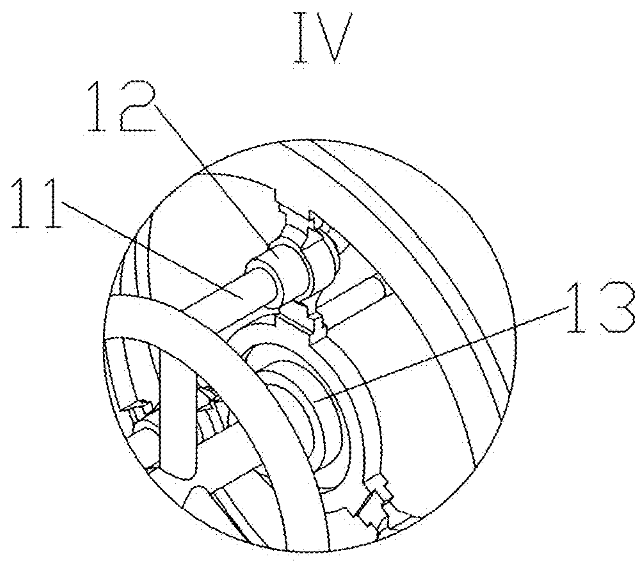
FIG. 14 is an enlarged structural view of part IV of FIG. 2.

As shown in FIG. 1 to FIG. 14, the technical solution adopted in the present disclosure is as follows: a grinding and crushing machine for magnesium powder production includes a base 1 and supporting columns 2, an air-flow pressure crushing mechanism 3 and an anti-blocking conical rotating and uniform crushing mechanism 19. The supporting columns 2 are symmetrically arranged on a side wall of the base 1; the air-flow pressure crushing mechanism 3 is arranged on an upper wall of the base 1; the anti-blocking conical rotating and uniform crushing mechanism 19 is arranged on the supporting columns 2. The air-flow pressure crushing mechanism 3 includes a gas source mechanism 4, a gas conveying mechanism 8 and an impact mechanism 14; the gas source mechanism 4 is arranged on the upper wall of the base 1, and the gas conveying mechanism 8 is arranged on a side wall of the gas source mechanism 4; and the impact mechanism 14 is arranged on the supporting columns 2. The anti-blocking conical rotating and uniform crushing mechanism 19 includes a conical filtering mechanism 20, a rotating grinding mechanism 26 and a material pushing mechanism 34; the conical filtering mechanism 20 is arranged on an inner wall of one end of the impact mechanism 14, and the rotating grinding mechanism 26 is arranged inside the conical filtering mechanism 20; and the material pushing mechanism 34 is arranged on a bottom wall of the impact mechanism 14.

The gas source mechanism 4 includes a gas source box 5, a gas compressor 6 and a compressed gas pipe 7; the gas source box 5 is arranged on the upper wall of the base 1, the gas compressor 6 is arranged in the gas source box 5; and the compressed gas pipe 7 penetrates through the gas source box 5 and is arranged at the exhaust end of the gas compressor 6. The gas conveying mechanism 8 includes a main gas pipe 9, an annular pipe 10, shunt pipes 11, shunt valves 12 and a main gas valve 13; the main gas pipe 9 is in communication with one end of the compressed gas pipe 7 away from the gas compressor 6; the annular pipe 10 is in communication with one end of the main gas pipe 9 away from the compressed gas pipe 7; multiple shunt pipes 11 are in communication with the annular pipe 10 and are arranged at one side of the annular pipe 10 away from the gas source box 5. The shunt valve 12 is in communication with the shunt pipe 11 and is arranged outside the shunt pipe. The main gas valve 13 is in communication with the main gas pipe 9 and arranged outside the main gas pipe 9. The impact mechanism 14 includes a crushing frame 15, a crushing cylinder 16, a crushing cavity 17 and impact pipes 18; the crushing frame 15 is arranged at one end of the supporting column 2 away from the base 1; the crushing cylinder 16 is arranged at one end of the crushing frame 15 away from the supporting column 2; and the crushing cavity 17 is arranged in one end of the crushing cylinder 16 close to the gas source box 5. One end of the shunt pipe 11 away from the annular pipe 10 penetrates through the crushing cylinder 16 and is in communication with the crushing cavity 17; the impact pipe 18 is in communication with the shunt pipe 11 and arranged at the side of the shunt pipe 11 away from the annular pipe 10; the impact pipe 18 is arranged in the crushing cavity 17. Ends of the impact pipes 18 away from the shunt pipes 11 are oppositely arrange.

The conical filtering mechanism 20 includes an annular plate 21, a conical filtering cylinder 22, crushing plates 23, a discharge cavity 24, a discharge port 25, a rotating grinding annular plate 43 and a bevel annular plate 44; the annular plate 21 is rotatably arranged on an inner wall of one end of the crushing cylinder 16 away from the crushing cavity 17; the conical filtering cylinder 22 is arranged on an inner wall of the annular plate 21, one end of the conical filtering cylinder 22 is opened, and multiple crushing plates 23 are arranged on a side wall of the conical filtering cylinder 22; the discharge cavity 24 is arranged in the crushing cylinder 16 at a side of the conical filtering cylinder 22 away from the crushing cavity 17; the discharge port 25 is arranged on one end of the bottom wall of the crushing cylinder 16 close to the discharge cavity 24; the rotating grinding annular plate 43 is arranged inside one end of the crushing cylinder 16 close to the crushing cavity 17; and the bevel annular plate 44 is arranged at one side of the conical filtering cylinder 22 close to the rotating grinding annular plate 43. The rotating grinding mechanism 26 includes a rotating grinding basin 27, a sound insulation cylinder 28, a tuning fork 29, a detection cylinder 30, a noise sensor 31, a driving motor 32 and a driving shaft 33; the rotating grinding basin 27 is arranged at one side of the conical filtering cylinder 22 close to the crushing cavity 17, and the crushing cavity 17 is provided with an opening at one end; the sound insulation cylinder 28 penetrates through the conical filtering cylinder 22 and is arranged on a side wall of the rotating grinding basin 27. The tuning fork 29 is arranged on the side wall of the rotating grinding basin 27 inside the sound insulation cylinder 28; the detection cylinder 30 is arranged at one side of the sound insulation cylinder 28 away from the rotating grinding basin 27; the noise sensor 31 is arranged in the detection cylinder 30; a detection end of the noise sensor 31 penetrates through the detection cylinder 30 and is arranged in the sound insulation cylinder 28; the detection cylinder 30 is arranged at one side of the crushing cylinder 16 away from the base 1; and the driving shaft 33 penetrates through the crushing cylinder 16 and is arranged between the conical filtering cylinder 22 and a power end of the driving motor 32. The material pushing mechanism 34 includes a wear rubber layer 35, a material pushing rack 36, impacted plates 37, impact rods 38, tension springs 39, impact iron blocks 40 and driving electromagnets 41; the wear rubber layer 35 penetrates through the other end of the bottom wall of the crushing cylinder 16 close to the crushing cavity 17; the material pushing rack 36 is arranged between the crushing frame 15 and the base 1, and multiple impacted plates 37 are arranged on a bottom wall of the wear rubber layer 35. Multiple impact rods 38 penetrate through the upper wall of the material pushing rack 36. The tension spring 39 is arranged on the bottom wall of the material pushing rack 36 outside the impact rod 38. One end of the tension spring 39 away from the material pushing rack 36 is connected to the impact rod 38. The impact iron block 40 is arranged on the side of the impact rod 38 close to the impacted plate 37; and the driving electromagnet 41 is arranged on the upper wall of the material pushing rack 36 outside the impact rod 38.

The side wall of the gas source box 5 is provided with a controller 42.

The controller 42 is electrically connected with the gas compressor 6, the noise sensor 31, the driving motor 32 and the driving electromagnet 41 respectively.

The model of the controller 42 is SYC89C52RC-401.

The model of the noise sensor 31 is BR-ZS1.

When in use, magnesium powder production raw materials are put into the crushing cavity 17, and the magnesium powder production raw materials are put into the crushing cavity 17. The controller 42 controls the start of the gas compressor 6; the gas compressor 6 conveys the generated compressed gas to the interior of the main gas pipe 9 through the compressed gas pipe 7. In the initial state, the shunt valve 12 is in the open setting and the main gas valve 13 is in the closed setting; the main gas pipe 9 conveys compressed gas to the interior of the shunt pipe 11 through the annular pipe 10; the compressed gas in the shunt pipe 11 enters the crushing cavity 17 through the impact pipe 18. Under the impact, collision, friction and shearing of high-speed airflow, the collision between magnesium powder raw materials and high-speed airflow becomes frequent and intense, and the magnesium powder raw materials are gradually crushed into fine particles.

Under the action of the high-speed airflow generated by the gas compressor 6, magnesium powder raw materials collide with each other, and magnesium powder raw materials also collide with the rotating grinding annular plate 43. Magnesium powder generated by the collision of magnesium powder raw materials in the crushing cavity 17 flows with the gas, and magnesium powder conforming to the mesh opening diameter of the conical filtering cylinder 22 flows into the discharge cavity 24; a magnesium powder containing structure is set inside the discharge port 25 in advance, and the gas containing magnesium powder inside the discharge cavity 24 is discharged into the preset magnesium powder containing structure from the discharge port 25. When the magnesium powder material larger than the mesh diameter of the conical filtering cylinder 22 falls onto the surface of the conical filtering cylinder 22 with the airflow, the controller 42 controls the driving motor 32 to start, and the driving motor 32 drives the driving shaft 33 to rotate through the power end; the driving shaft 33 drives the conical filtering cylinder 22 to rotate along the inner wall of the crushing cylinder 16 through the annular plate 21; the magnesium powder raw material attached to the surface of the conical filtering cylinder 22 is thrown away by the centrifugal movement, and the thrown magnesium powder raw material collides with the rotating grinding annular plate 43 and the bevel annular plate 44. The magnesium powder produced after the collision flows into the discharge cavity 24 through the mesh opening with the gas. In addition, the magnesium powder raw material splashed around the conical filtering cylinder 22 is crushed by the crushing plate 23 rotating at high speed, so that the raw material which may not be crushed into magnesium powder under the high-speed airflow may be blocked and crushed. On the one hand, the raw materials of magnesium powder may be prevented from block the mesh opening of the conical filtering cylinder 22 and affecting the passage of magnesium powder; on the other hand, the problem of uneven crushing of magnesium powder raw materials by the high-speed airflow may be made up, so that the magnesium powder raw materials may be crushed evenly.

The conical filtering cylinder 22 drives the bevel annular plate 44 to rotate inside the rotating grinding annular plate 43. Magnesium powder raw material is impacted by airflow at the joint between the annular plate 21 and bevel annular plate 44, the bevel annular plate 44 is arranged on the side of the conical filtering cylinder 22 close to the crushing cavity 17, the end of the bevel annular plate 44 near the conical filtering cylinder 22 is the highest point. The magnesium powder raw material slides downward along the inclined angle due to the action of gravity during the rotation, and drops onto the upper wall of the wear rubber layer 35. After the magnesium powder raw material in the crushing cavity 17 is crushed to the time specified by the user, the magnesium powder raw material with high hardness which is not pulverized in the crushing cavity 17 is crushed by combined gas. The shunt valves 12 are closed and the main gas valve 13 is opened, so that the main gas pipe 9 is in communication with the crushing cavity 17. The impact force of the gas discharged from the main gas pipe 9 without shunt is greater. With the continuous rotation of the bevel annular plate 44, the magnesium powder raw material falling onto the inner wall of the bevel annular plate 44 gradually rolls down to the upper wall of the wear rubber layer 35 through the opening at the bottom of the rotating grinding annular plate 43, and the compressed gas discharged from the main gas pipe 9 impacts the inner wall of the rotating grinding basin 27.

At this time, the controller 42 controls the driving electromagnet 41 to start, and the driving electromagnet 41 is electrified to generate magnetism; the tension spring 39 is shortened, and the upper wall of the impact iron block 40 is attached to the bottom wall of the impacted plate 37. The driving electromagnet 41 is fixed on the upper wall of the material pushing rack 36 and adsorbs the impact iron block 40 through magnetic. Under the deformation of the tension spring 39, the impact iron block 40 slides away from the bottom wall of the impacted plate 37 along the material pushing rack 36 through the impact rod 38. Subsequently, the driving electromagnet 41 is de-energized and demagnetized, and the tension spring 39 is elastically reset and drives the impact iron block 40 to impact the impacted plate 37 through the impact rod 38. Under the deformation of the wear rubber layer 35, the impacted plate 37 protrudes towards the crushing cylinder 16; the magnesium powder raw material on the inner wall of the wear rubber layer 35 bounces up and enters the high-speed airflow discharged from the main gas pipe 9 under the sudden impact. The controller 42 controls the driving electromagnet 41 to be energized intermittently, the magnesium powder raw material on the inner wall of the wear rubber layer 35 is bounced through the impact iron block 40, the high-speed airflow with high pressure drives the magnesium powder raw material with high hardness to collide with the rotating grinding basin 27 that is in rotation; the magnesium powder generated by the collision enters the discharge cavity 24 with the airflow. The remaining magnesium powder raw materials are located on the inner wall of the rotating grinding basin 27 under the impact of high-speed airflow, the rotating grinding basin 27 grinds the magnesium powder raw material by rotation, and gradually refines the magnesium powder raw material with higher hardness.

When the high-speed airflow discharged from the main gas pipe 9 drives the magnesium powder raw material bounced by the wear rubber layer 35 to impact the rotating grinding basin 27, hard magnesium powder raw material will cause the rotating grinding basin 27 vibrate during the impact. The rotating grinding basin 27 transmits the vibration to the interior of the tuning fork 29, and the tuning fork 29 is vibrated to generate sound. The controller 42 controls the noise sensor 31 to start, and the noise sensor 31 monitors the decibels produced by the tuning fork 29. When the noise sensor 31 monitors that the decibel inside the detection cylinder 30 disappears, indicating that the hard magnesium powder raw materials scattered on the upper wall of the wear rubber layer 35 are all refined. The above operations may be repeated for the next use.

It should be noted that in the present disclosure, relational terms such as first and second are only used to distinguish one entity or operation from another entity or operation, and do not necessarily require or imply that there is any such actual relationship or order between these entities or operations. Moreover, the terms "include", "comprise" or any other variation thereof are intended to cover non-exclusive inclusion, so that a process, method, object or device including a series of elements includes not only those elements, but also other elements not explicitly listed, or elements inherent to such process, method, object or device.

The present disclosure and its implementation have been described above, and this description is not restrictive. The embodiment shown in the attached drawings is only one of the implementations of the present disclosure, and the actual structure is not limited to this. In a word, if one of ordinary skill in the art inspired by it, under the premise of not departing from the design spirit of the present disclosure, any structural methods and embodiments similar to the technical solution without creative effort should all within the protection scope of the present disclosure.

What is claimed is:

1. A grinding and crushing machine for magnesium powder production, comprising: a base and supporting columns, and further comprising an air-flow pressure crushing mechanism and an anti-blocking conical rotating and uniform crushing mechanism; wherein the supporting columns are symmetrically arranged on a side wall of the base; the air-flow pressure crushing mechanism is arranged on an upper wall of the base; the anti-blocking conical rotating and uniform crushing mechanism is arranged on the supporting columns; the air-flow pressure crushing mechanism comprises a gas source mechanism, a gas conveying mechanism and an impact mechanism, wherein the gas source mechanism is arranged on the upper wall of the base, and the gas conveying mechanism is arranged on a side wall of the gas source mechanism, and the impact mechanism is arranged on the supporting columns; and the anti-blocking conical rotating and uniform crushing mechanism comprises a conical filtering mechanism, a rotating grinding mechanism and a material pushing mechanism, wherein the conical filtering mechanism is arranged on an inner wall of one end of the impact mechanism, the rotating grinding mechanism is arranged in the conical filtering mechanism, and the material pushing mechanism is arranged on a bottom wall of the impact mechanism;

wherein the gas source mechanism comprises a gas source box, a gas compressor and a compressed gas pipe; and wherein the gas source box is arranged on the upper wall of the base, the gas compressor is arranged in the gas source box; and the compressed gas pipe penetrates through the gas source box and is arranged at an exhaust end of the gas compressor;

wherein the impact mechanism comprises a crushing frame, a crushing cylinder, a crushing cavity and impact pipes; and wherein the crushing frame is arranged at one end of the supporting columns away from the base, the crushing cylinder is arranged at one end of the crushing frame away from the supporting columns, and the crushing cavity is arranged in one end of the crushing cylinder close to the gas source box;

wherein the conical filtering mechanism comprises an annular plate, a conical filtering cylinder, crushing plates, a discharge cavity, a discharge port, a rotating grinding annular plate and a bevel annular plate; and wherein the annular plate is rotatably arranged on an inner wall of one end of the crushing cylinder away from the crushing cavity; the conical filtering cylinder is arranged on an inner wall of the annular plate, one end of the conical filtering cylinder is opened, and a plurality of groups of the crushing plates are arranged on a side wall of the conical filtering cylinder; the discharge cavity is arranged in the crushing cylinder at one side of the conical filtering cylinder away from the crushing cavity; the discharge port is arranged on one end of a bottom wall of the crushing cylinder close to the discharge cavity; the rotating grinding annular plate is arranged in one end of the crushing cylinder close to the crushing cavity; and the bevel annular plate is arranged at one side of the conical filtering cylinder close to the rotating grinding annular plate;

wherein the rotating grinding mechanism comprises a rotating grinding basin, a sound insulation cylinder, a tuning fork, a detection cylinder, a noise sensor, a driving motor and a driving shaft; and wherein the rotating grinding basin is arranged at the one side of the conical filtering cylinder close to the crushing cavity; one end of the crushing cavity is opened; and the sound insulation cylinder penetrates through the conical filtering cylinder and is arranged on a side wall of the rotating grinding basin;

wherein the material pushing mechanism comprises a wear rubber layer, a material pushing rack, impacted plates, impact rods, tension springs, impact iron blocks and driving electromagnets; and wherein the wear rubber layer penetrates through one end of the bottom wall of the crushing cylinder close to the crushing cavity; the material pushing rack is arranged between the crushing frame and the base; and a plurality of groups of the impacted plates are arranged on a bottom wall of the wear rubber layer;

wherein the gas conveying mechanism comprises a main gas pipe, an annular pipe, shunt pipes, shunt valves and a main gas valve; and wherein the main gas pipe is in communication with one end of the compressed gas pipe away from the gas compressor; the annular pipe is in communication with one end of the main gas pipe away from the compressed gas pipe; a plurality of groups of the shunt pipes are in communication with and arranged at one side of the annular pipe away from the gas source box; the shunt valves are in communication with and arranged outside the shunt pipes; and the main gas valve is in communication with and arranged outside the main gas pipe; and wherein one end of each of the shunt pipes away from the annular pipe penetrates through the crushing cylinder and is in communication with the crushing cavity, the impact pipes are in communication with and arranged at sides of the shunt pipes away from the annular pipe, the impact pipes are arranged in the crushing cavity, and ends of the impact pipes away from the shunt pipes are oppositely arranged.

2. The grinding and crushing machine for magnesium powder production according to claim 1, wherein the tuning fork is arranged on the side wall of the rotating grinding basin in the sound insulation cylinder; the detection cylinder is arranged at one side of the sound insulation cylinder away from the rotating grinding basin; the noise sensor is arranged in the detection cylinder; a detection end of the noise sensor penetrates through the detection cylinder and is arranged in the sound insulation cylinder; the detection cylinder is arranged at one side of the crushing cylinder away from the base; and the driving shaft penetrates through the crushing cylinder and is arranged between the conical filtering cylinder and a power end of the driving motor.

3. The grinding and crushing machine for magnesium powder production according to claim 2, wherein a plurality of groups of the impact rods penetrate through and are arranged at an upper wall of the material pushing rack; the tension springs are arranged on a bottom wall of the material pushing rack outside the impact rods; ends of the tension springs away from the material pushing rack are connected with the impact rods; the impact iron blocks are arranged on sides of the impact rods close to the impacted plates; and the driving electromagnets are arranged on the upper wall of the material pushing rack outside the impact rods.

* * * * *